United States Patent [19]

Takahashi

[11] Patent Number: 4,982,995

[45] Date of Patent: * Jan. 8, 1991

[54] LID REGULATING DEVICE FOR SUN ROOF STRUCTURE

[75] Inventor: Jun Takahashi, Yokohama, Japan

[73] Assignee: Ohi Seisakusho Co., Ltd., Yokohama, Japan

[*] Notice: The portion of the term of this patent subsequent to May 8, 2007 has been disclaimed.

[21] Appl. No.: 216,653

[22] Filed: Jul. 8, 1988

[30] Foreign Application Priority Data

Jul. 17, 1987 [JP] Japan .............................. 62-177276
Jul. 17, 1987 [JP] Japan .......................... 62-109115[U]

[51] Int. Cl.⁵ .............................. B60J 7/05; B60J 7/19
[52] U.S. Cl. .................................... 296/221; 296/224
[58] Field of Search ............................... 296/221-224

[56] References Cited

U.S. PATENT DOCUMENTS 4,647,105  3/1987  Pollard .............................. 296/221

FOREIGN PATENT DOCUMENTS 59-128012  7/1984  Japan .
0071723  4/1987  Japan .............................. 296/216

Primary Examiner—Dennis H. Pedder

Attorney, Agent, or Firm—Foley & Lardner, Schwartz, Jeffery, Schwaab, Mack, Blumenthal & Evans

[57] ABSTRACT

There is disclosed a lid regulating device for use in a sun roof structure of a motor vehicle or the like. The lid regulating device comprises a guide rail extending along each side of a sun roof opening and secured to a body of the vehicle; a first sliding shoe slidably engaged with the guide rail, the first sliding shoe having an extension which is pivotally connected to a front portion of the lid, the extension having a stopper opening formed therethrough; a stopper structure including a holder securedly mounted on the guide rail, a stopper pin axially movably held by the holder, and a spring for biasing the stopper pin outwardly, the stopper pin being projected into the stopper opening of the extension of the first sliding shoe when the lid is brought to its fully closed position; an operation lever pivotally connected to the first sliding shoe, the operation lever having a projection which, when the lid assuming the fully closed position is tilted downward, pushes the stopper pin against the force of the biasing spring thereby to disengage the stopper pin from the stopper opening; and a second sliding shoe slidably engaged with the guide rail and supporting a rear portion of the lid, the second sliding shoe having a lift mechanism mounted thereon to tilt the lid upward and downward about the front portion of the lid.

10 Claims, 5 Drawing Sheets

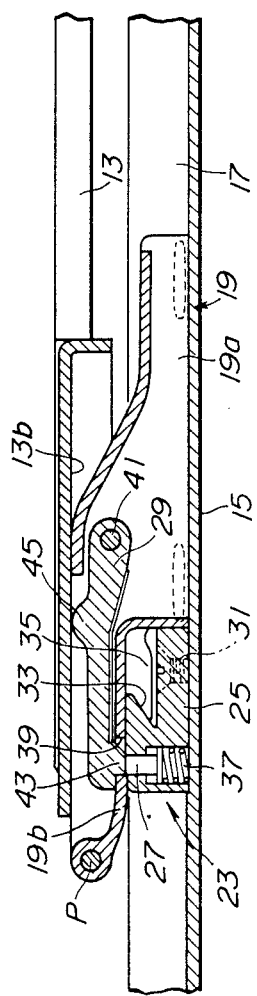
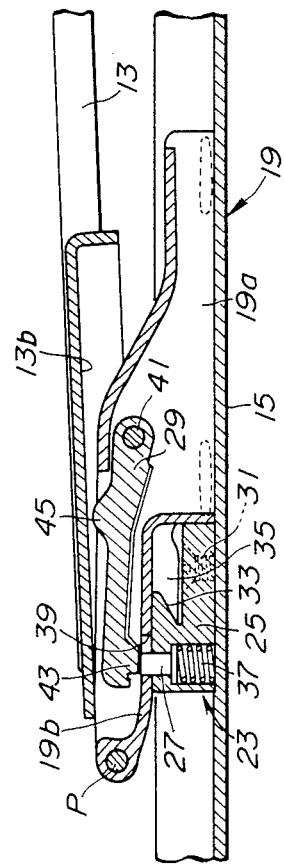
FIG.1   FIG.2   FIG.3

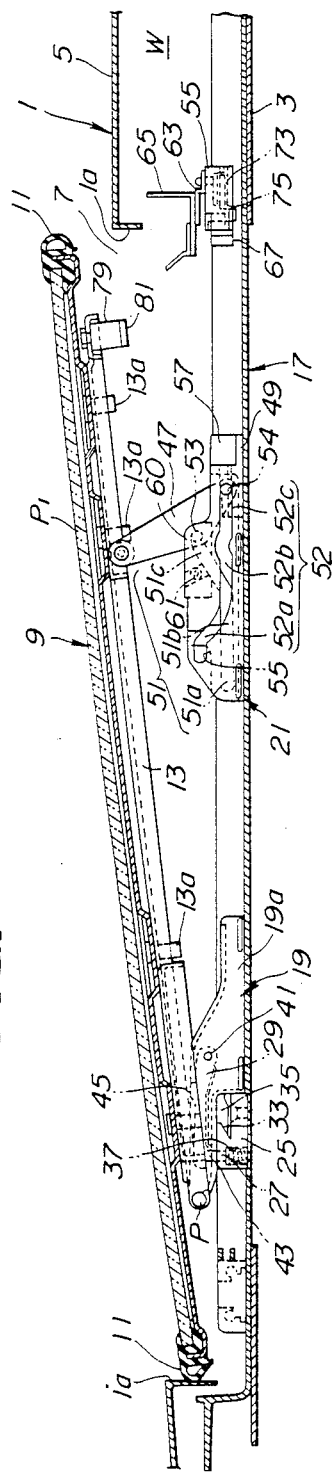
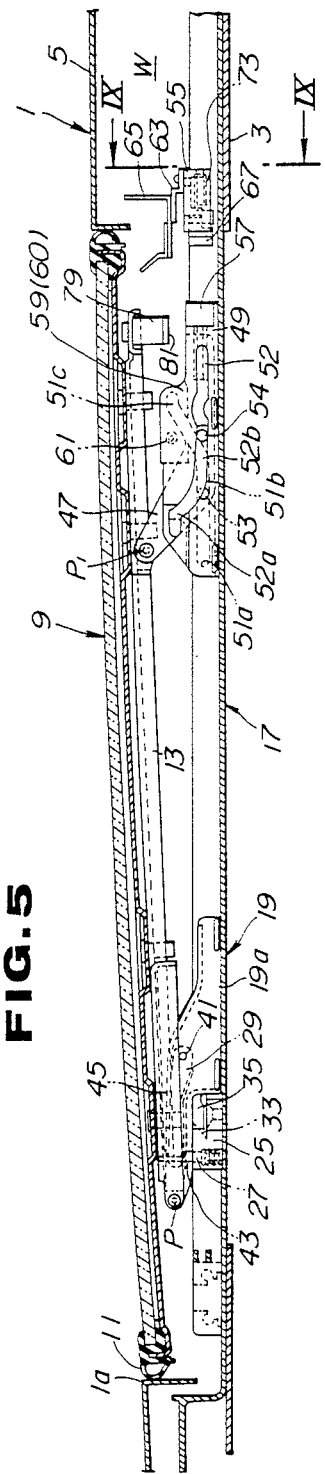

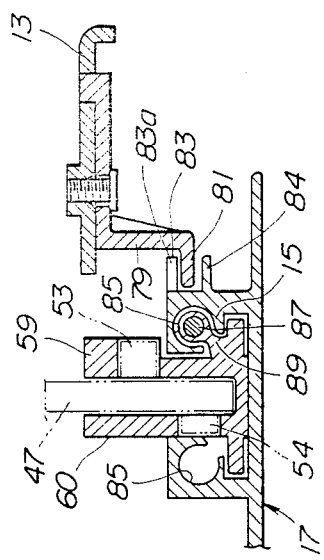
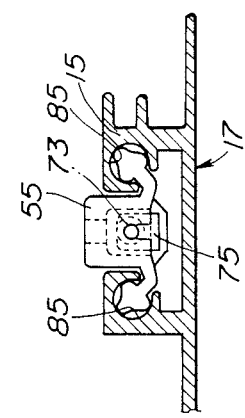
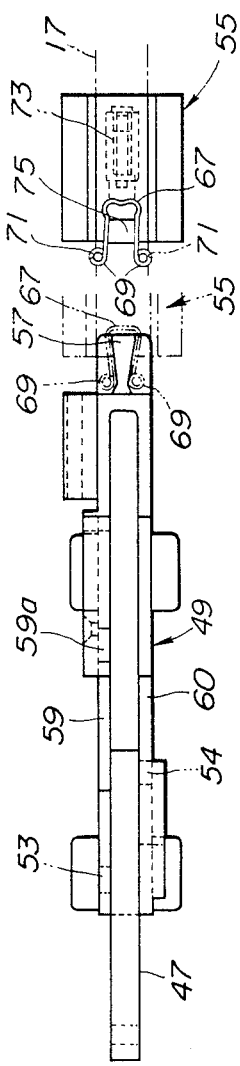

LID REGULATING DEVICE FOR SUN ROOF STRUCTURE

BACKGROUND OF THE INVENTION

1. Field of the Invention

The present invention relates in general to a sun roof structure of a motor vehicle, and more particularly to a lid regulating device of the sun roof structure, which regulates the movement of the lid.

2. Description of the Prior Art

Hitherto, various kinds of lid regulating devices have been proposed and put into practical use in the field of the sun roof structures of a motor vehicle. One of them is disclosed in Japanese Patent First Provisional Publication No. 59-128012, which comprises a pair of front supporting mechanisms which support a front portion of a lid, a pair of rear supporting mechanisms which support a rear portion of the lid, and a pair of guide rails along which the front and rear supporting mechanisms slide forward and rearward. The rear supporting mechanisms have each a lifting mechanism by which the lid can be tilted up and down about the front portion thereof from its fully closed position. In order to restrain the lid in the fully closed position, each rear supporting mechanism has a spring-biased hook member which, when the lid is brought to the fully closed position, is latchingly engaged with a cut opening formed in the guide rail.

However, due to its inherent construction, the lid regulating device disclosed in the publication has the following drawbacks.

First, because of the provision of the cut opening in the guide rail, it is necessary to provide the lid regulating device with an additional sealing structure for preventing rain water penetration through the cut opening.

Second, when the sun roof opening is fully opened, the cut opening is viewed from the outside of the vehicle. This deteriorates the external view of the sun roof structure.

Third, since the hook member is located in a space into which a finger of a passenger's hand can be easily inserted, there is such a possiblity that the latched condition of the lid is suddenly cancelled by a mischievous body who touches the hook member.

Fourth, the lid regulating device fails to have a specially defined structure by which a front portion of the lid in its fully closed position is prevented from suffering an upward and downward movement or play during cruising of the motor vehicle.

SUMMARY OF THE INVENTION

It is therefore an object of the present invention to provide a lid regulating device which is free of the above-mentioned drawbacks.

According to the present invention, there is provided a lid regulating device for use in a sun roof structure which includes a lid and a sun roof opening defined by a roof. The lid regulating device comprises a guide rail extending along each side of the sun roof opening and secured to the roof; a first sliding shoe slidably engaged with the guide rail, the first sliding shoe having an extension which is pivotally connected to a front portion of the lid, the extension having an opening formed therethrough; a stopper structure including a holder securely mounted on the guide rail, a stopper pin axially movably held by the holder, and biasing means for biasing the stopper pin outwardly, the stopper pin being projected into the opening of the extension of the first sliding shoe when the lid is brought to its fully closed position; an operation lever pivotally connected to the first sliding shoe, the operation lever having a projection which, when the lid assuming the fully closed position is tilted downward, pushes the stopper pin against the force of the biasing means thereby to disengage the stopper pin from the stopper opening; and a second sliding shoe slidably engaged with the guide rail and supporting a rear portion of the lid, the second sliding shoe having a lift mechanism mounted thereon to tilt the lid upward and downward about the front portion of the lid.

BRIEF DESCRIPTION OF THE DRAWINGS

Other objects and advantages of the present invention will become apparent from the following description when taken in conjunction with the accompanying drawings, in which:

FIG. 1 is a sectional view of a first sliding shoe of a lid regulating device according to the present invention;

FIGS. 2 and 3 are views similar to FIG. 1, but showing different conditions of the first sliding shoe respectively;

FIG. 4 is a sectional view of a sun roof structure to which the present invention is applied, showing a condition wherein the lid assumes a tilt-up position;

FIG. 5 is a view similar to FIG. 4, but showing a condition wherein the lid assumes its full-closed position;

FIG. 9 is an enlarged sectional view taken along the line IX—IX of FIG. 5;

FIG. 10 is an enlarged sectional view taken along the line X—X of FIG. 6; and

FIG. 11 is a plan view of the second sliding shoe and a third sliding shoe.

DETAILED DESCRIPTION OF THE INVENTION

Figure 6:
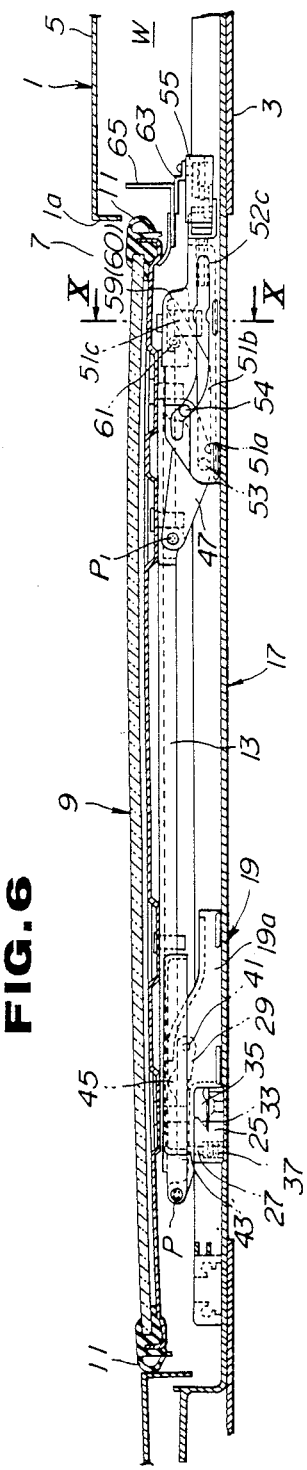
FIG. 6 is a view similar to FIG. 4, but showing a condition wherein the lid assumes a tilt-down position.

In the following, the present invention will be described in detail with reference to the accompanying drawings.

Referring to the accompanying drawings, particularly FIG. 4, there is shown a sun roof structure to which the present invention is practically applied.

As is seen from FIG. 4, the sun roof structure comprises a sun roof opening 7 formed in a roof panel 1 of a motor vehicle. The roof panel shown in the drawing includes an inner panel 3 and an outer panel 5 which are combined in a known manner. The outer panel 5 has a normally bent edge 1a by which the sun roof opening 7 is bounded. A sun roof lid 9 of transparent material is incorporated with the opening 7 in a manner to open and close the same, as will be described in detail hereinafter.

The lid 9 is equipped about its peripheral edge with a weather strip 11. Upon full closing of the lid 9 as shown in FIG. 5, the weather strip 11 is brought into a resilient contact with the bent edge 1a of the sun roof opening 7 thereby achieving a watertight seal therebetween.

A pair of (viz., right and left) lid control units are incorporated with the lid 9 for controlling movement of the lid 9 relative to the sun roof opening 7. These units are arranged at lateral sides of the sun roof opening 7, respectively. The two units are substantially the same in construction except the orientation of parts arranged thereon. That is, the parts of the two units are arranged symmetrically with respect to an axis of the sun roof opening 7. Thus, the following description will be directed to only one of them, that is, to the left unit which is arranged at a left side of the sun roof opening 7. (The terms "right" and "left" are to be understood with respect to a person who sits with his or her breast directed forward).

Figure 8:
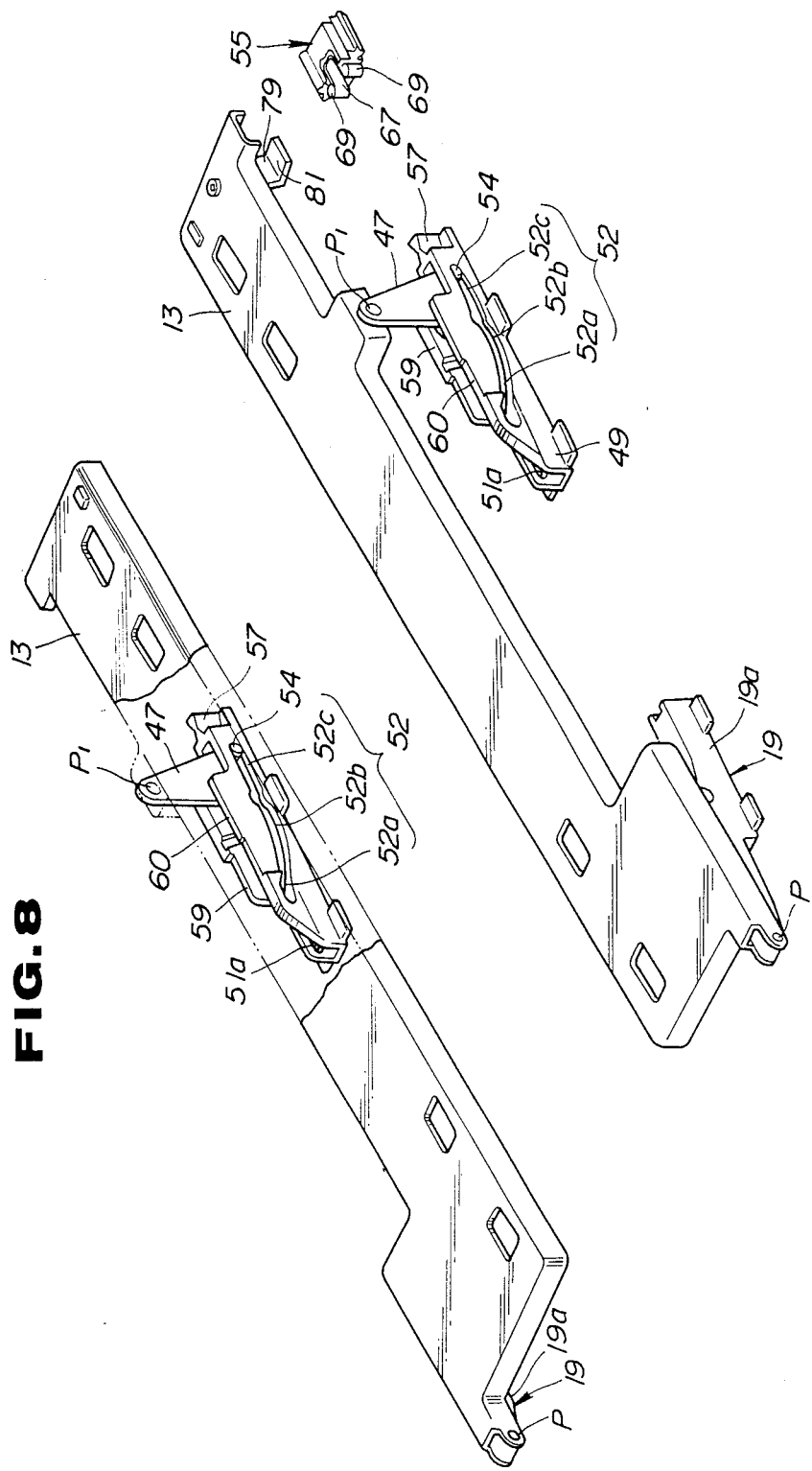
FIG. 8 is a perspective view of a lid mounting bracket.

The left unit comprises an elongate mounting bracket 13 (viz., the bracket 13 illustrated in the right side of FIG. 8) which is secured through connecting bolts 13a (see FIG. 4) to a left side of the lower surface of the lid 9 to extend along the same, as is seen from FIG. 4.

Below the mounting bracket 13, there is arranged a left guide rail 17 which extends along a left side of the sun roof opening 7. As is seen from FIG. 4, the guide rail 17 is securely mounted on the inner panel 3 of the roof panel 1. As is seen from FIG. 9, the guide rail 17 is formed with a channel structure 15 which extends therealong with its open side directed upward.

Within the channel structure 15 of the guide rail 17, there is disposed a major portion of a first sliding shoe 19a which is slidable therealong in a fore-and-aft direction. As will be clarified hereinafter, the first sliding shoe 19a is a part of a supporting mechanism 19 by which a front left portion of the lid 9 is supported. As is seen from FIG. 1, the first sliding shoe 19a comprises a base portion slidably received in the channel structure 15 of the guide rail 17 and an extension portion exposed to the outside of the channel structure 15. As is seen from FIG. 8, a front end of the mounting bracket 13 is pivotally connected to a leading end of the extension of the first sliding shoe 19a through a pivot pin P. For this pivotal connection, the front end of the bracket 13 is formed at its outboard side with forwardly projected spaced walls (no numerals) between which the leading end of the extension portion of the first sliding shoe 19a is put with the pivot pin P horizontally extending therebetween.

A rear portion of the mounting bracket 13 is supported by an after-described lifting mechanism 21, so that the rear portion is lifted from the guide rail 17 under a given condition.

As is shown in FIG. 1, a lock mechanism 23 is mounted on a front part of the guide rail 17 to latch or stop the first sliding shoe 19a. The lock mechanism 23 comprises a holder 25 secured through a bolt 31 to a bottom of the channel structure 15. The holder 25 is formed with a vertically extending bore (no numeral) in which a stopper pin 27 is slidably received. A spring 37 is put in a bottom of the bore to bias the stopper pin 27 upward causing an upper end of the pin 27 to project from the bore. As will become apparent as the description proceeds, under a given condition, the projected upper end of the stopper pin 27 is pressed downward by an operation lever 29 which is pivotally carried by the first sliding shoe 19a. The holder 25 is formed at its rear portion with a wedge-shaped recess 33 which faces rearward as shown. The recess 33 is bounded at its upper portion by a tapered wall 33a. That is, the tapered wall 33a slopes down toward the depth of the recess 33.

A boss 35 is integrally formed on a lower surface 19b of the extension portion of the first sliding shoe 19a, so that upon latching of the first sliding shoe 19a to the lock mechanism 23, the boss 35 is neatly put in the recess 33. The boss 35 is formed with a wedge shaped front portion the upper surface 35a of which slopes down toward the tip thereof. Thus, once the wedge-shaped boss 35 is neatly mated with the wedge-shaped recess 33, the undesired upward and downward play of the front portion of the lid 9 is suppressed.

The extension portion of the first sliding shoe 19a is formed at its lower surface 19b with a stopper opening 39 which is sized to receive therein the upper end of the stopper pin 27. That is, when the first sliding shoe 19a slides to its foremost position wherein the stopper opening 39 is coincident with the stopper pin 27, the latter is thrusted into the stopper opening 39 due to the force of a spring 37. Thus, thereafter, the forward and rearward movement of the first sliding shoe 19a is suppressed.

The operation lever 29 is almost received in a recess formed in the extension portion of the first sliding shoe 19a and pivotally supported at its rear end to a middle portion of the first sliding shoe 19a through a pivot pin 41. A free end of the operation lever 29 is formed with a downward projection 43 which can fall into the stopper opening 39. The downward projection 43 is so sized and constructed that when the operation lever 29 assumes its lowermost position as shown in FIG. 1, the downward projection 43 fills up the stopper opening 39. The operation lever 29 is formed near the pivoted rear end thereof with an upward projection 45. As will be described hereinafter, when the lid 9 is being tilted down, the upward projection 45 is kept pressed downward by a lower surface 13b of the mounting bracket 13.

The lifting mechanism 21 is pivotally arranged on a second sliding shoe 49 which is also slidably engaged with the channel structure 15 of the guide rail 17. As is best seen from FIG. 7, the lifting mechanism 21 comprises a lift arm 47 which has a leading end pivotally connected to the mounting bracket 13 through a pivot pin $P_1$ (see FIG. 8). A base portion of the lift arm 47 has on opposed side surfaces thereof first and second pins 53 and 54 slidably received in first and second guide slots 51 and 52 which are possessed by the second sliding shoe 49, as will be described hereinafter.

The second sliding shoe 49 is located behind the first sliding shoe 19a and axially slidably guided by the channel structure 15 of the guide rail 17. The second sliding shoe 49 is formed at its rear end with an engaging portion 57 to which an after-mentioned third sliding shoe 55 is detachably connected. As is shown, the engaging portion 57 comprises a thinner base part and a thicker head part which are integrally connected to constitute a dove-tail structure. The second sliding shoe 49 is formed with mutually spaced first and second walls 59 and 60 which extend in parallel and are respectively formed with the above-mentioned first and second guide slots 51 and 52. The distance between the first and second walls 59 and 60 is somewhat greater than the thickness of the lift arm 47. As shown, the first wall 59 has a front end portion cut. The second guide slot 52 of the second wall 60 has an enlarged front end which is exposed to the cut front portion of the first wall 59, so that, as will be understood from FIG. 7, the second pin 54 of the lift arm 47 can be easily brought into engagement with the second guide slot 52 from the outside. The first wall 59 is formed at its inboard surface with a pin guide groove 59a which extends from an upper end of the wall 59 to a given portion of the first guide slot 51. That is, the first pin 53 of the lift arm 47 can be easily brought into engagement with the first guide slot 51 by sliding through the pin guide groove 59a from the outside. The guide groove 59a is formed with a bolt opening 59b to which a bolt 61 (see FIG. 6) is to be fixed for closing the guide groove 59a. That is, once the lift arm 47 is properly mounted to the second sliding shoe 49, the guide groove 59a is closed with the bolt 61.

As is best seen from FIG. 4, the first guide slot 51 formed in the first wall 59 comprises a first horizontal part 51a located at a front portion of the slot 51, a second horizontal part 51b located at a middle portion of the slot 51 and a third inclined part 51c located at a rear part of the same. As will be described hereinafter, when the first pin 53 slides forward within the first horizontal part 51a, the lid 9 is tilted down having the rear end lowered below the outer panel 5 of the vehicle roof, and when the first pin 53 is placed within the second horizontal part 51b, the lid 9 assumes its fully closed position, and when the first pin 53 slides rearward within the third inclined part 51c, the lid 9 is tilted up having the rear end located above the outer panel 5.

Figure 7:
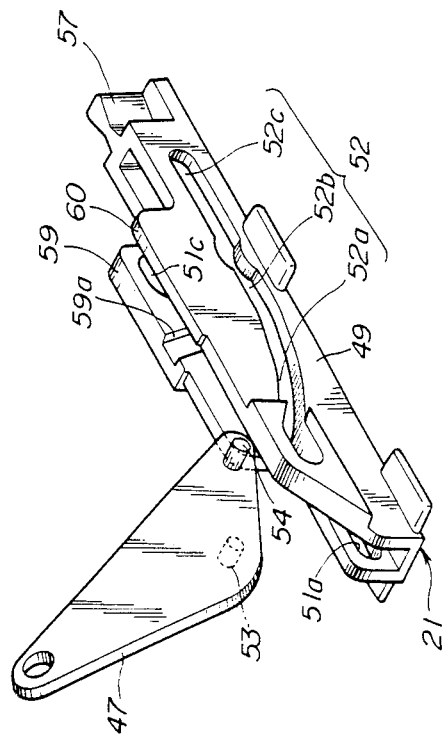
FIG. 7 is a perspective view of a second sliding shoe.

As is seen from FIG. 7, the second guide slot 52 formed in the second wall 60 comprises a first inclined part 52a placed at a front portion of the slot 52, a second generally horizontal part 52b placed at a middle portion of the slot 52 and a third horizontal part 52c placed at a rear part of the same. That is, when the second pin 54 slides forward within the first inclined part 52a, the lid 9 is tilted down, and when the second pin 54 is placed within the second part 52b, the lid 9 is in the fully closed position, and the second pin 54 slides rearward within the third horizontal part 52c, the lid 9 is tilted up. It is to be noted that, as is seen from FIG. 7, the second parts 51b and 52b of the first and second guide slots 51 and 52 are placed at the same level, and the first part 51a of the first guide slot 51 is positioned below the first part 52a of the second guide slot 52, and the third part 51c of the first guide slot 51 is placed above the third part 52c of the second guide slot 52.

As is best seen from FIG. 11, the third sliding shoe 55 is located behind the second sliding shoe 49 and axially slidably engaged with the channel structure 15 of the guide rail 17. As is seen from FIG. 4, the third sliding shoe 55 holds through a bracket 63 a left end of a laterally extending rain water drain gutter 65.

Referring back to FIG. 11, the third sliding shoe 55 is equipped at its front end with a clip 67 which has a generally Ω (omega)-shaped cross section. That is, the clip 67 is constructed at a resilient metal plate and comprises a base portion held by the shoe 55 and two outwardly biased arms each having a leading end 69 turned outwardly. The outwardly turned ends 69 of the arms are slidably engaged with the opposed edges of the channel of the guide rail 17. The opposed edges of the channel are formed at a given position with respective stopper recesses 71 into which the outwardly turned ends 69 of the arms fall when the third sliding shoe 55 comes to a given stopped position. A strut member 75 is put between the arms of the clip 67. The strut member 75 has a normally bent extension led into the body of the third sliding shoe 55. The inward end of the extension is incorporated with a biasing spring 73, so that the strut member 75 is biased forward, that is, toward a position wherein the strut member 75 is placed near the turned leading ends of the arms. Thus, under this condition, the arms are prevented from flexing toward each other. That is, even when, with the turned ends of the arms kept engaged with the stopper recesses 71, an external force is applied to the clip 67, the latter is prevented from disengagement from the stopper recesses 71. It is to be noted that when, with the strut member 75 being retracted, the clip 67 assumes a position other than the stopped position, and the clip 67 is shaped to coincide with the dove-tail shaped engaging portion 57 of the second sliding shoe 49. Thus, it will be appreciated that when, with the third sliding shoe 55 assuming its stopped position with the clip 67 engaged with the stopper recesses 71, the second sliding shoe 49 moves rearward and comes to a position where the dove-tail engaging portion 57 of the second sliding shoe 49 is thrust between the arms of the clip 67 and pushes the strut member 75 rearward, the strut member 75 is retracted into the body of the third sliding shoe 55 against the force of the spring 73. Under this condition, the two arms of the clip 67 are permitted to flex toward each other cancelling the latched engagement between the clip 67 and the stopper recesses 71. Thus, thereafter, pushing of the second sliding shoe 49 rearward permits a sliding of the third sliding shoe 55 in the same direction. Once the above-mentioned latched engagement is cancelled, the dove-tail shaped engaging portion 57 of the second sliding shoe 49 is tightly held by the clip 67 of the third sliding shoe 55, in a manner as is shown by phantom lines in FIG. 11.

As is seen from FIG. 4, the mounting bracket 13 is provided at its rear end with an L-shaped stopper member 79 which comprises a major part and a normally bent lower end 81. As is seen from FIG. 10, the stopper member 79 is incorporated with a longitudinally extending smaller channel structure possessed by the guide rail 17. That is, this smaller channel structure comprises upper and lower flanges 83 and 84 which extend in parallel along the length of the guide rail 17. The upper flange 83 is formed at a given portion with a cut 83a through which the lower end 81 of the stopper member 79 passes when the lid 9 is tilted down. Usually, the lower end 81 of the stopper member 79 is slidably engaged with the channel of the smaller channel structure (83+84) to suppress a vertical movement or play of the rear end of the lid 9.

As is seen from FIG. 10, the channel structure 15 of the guide rail 17 is formed at opposed side walls with respective cable guide grooves 85 each extending along the length of the guide rail 17. A geared cable 87 is slidably received in the inside cable guide groove 85. The geared cable 87 is meshed with a drive pinion of a reversable electric motor (not shown) which is mounted on a passenger room ceiling at the front of the sun roof opening 7. It is to be noted that a free end portion (not shown) of the geared cable 87 which is drawn from the drive pinion is slidably led into the outside cable guide groove of the other guide rail (not shown) from the front open end of the same. The other geared cable (not shown) incorporated with the inside cable guide groove of the other guide rail (not shown) is also meshed with the drive pinion having its free end portion slidably led into the outside cable guide groove 85 of the illustrated guide rail 17 from the front open end of the same. Thus, when the electric motor is energized to run in one direction, the two geared cables 87 slide rearward (or forward) in the corresponding cable guide grooves 85 of the paired guide rails 17, when the electric motor is energized to run in the other direction, the geared cables 87 slide forward (or rearward).

As is seen from FIG. 10, the geared cable 87 is fixed to a connector 89 which is integral with the second sliding shoe 49, so that the axial movement of the geared cable 87 induces a sliding movement of the second sliding shoe 49 along the guide rail 17.

As has been mentioned previously, the other control unit which is arranged at a right side of the sun roof opening 7 is substantially the same as the above-mentioned left unit except for the orientation of the parts. It is thus to be noted that the lid 9 is supported at its front portion by the left and right first sliding shoes 19a and at its rear portion by the left and right second sliding shoes 49.

In the following, operation of the lid regulating device of the invention will be described with reference to FIGS. 4 to 6 which illustrate the left unit of the lid regulating device.

For ease of understanding, the description will be commenced with respect to the fully closed condition of the lid 9, as shown in FIG. 5, wherein the weather strip 11 of the lid 9 is in resilient contact with the bent edge la of the sun roof opening 7 to achieve a watertight sealing therebetween.

Under this closed condition, the stopper pin 27 of the lock mechanism 23 is engaged with the stopper opening 39 of the first sliding shoe 19a, so that forward and rearward movement of the lid 9 is suppressed. As is shown in FIG. 5, in the second sliding shoe 49, the first and second pins 53 and 54 are placed at the second parts 51b and 52b of the first and second slots 51 and 52 respectively causing the lift arm 47 to assume its rest or neutral position. Furthermore, under this fully closed condition of the lid 9, the third sliding shoe 55 assumes the stopped position having the clip 67 engaged with the stopper recesses 71 of the guide rail 17. Because, in this condition, the stopper pin 27 and the operation lever 29 are fully concealed by the first sliding shoe 19a, they are protected from being handled accidentally. Furthermore, the intimate engagement between the wedge-shaped boss 35 of the first sliding shoe 19a and the wedge-shaped recess 33 of the holder 25 suppresses the undesired upward and downward play of the front portion of the lid 9.

When, now, by energizing the electric motor, the geared cable 87 is slid forward (that is, leftward in FIG. 5) by a given small distance, the first pin 53 is slid up to the third part 51c of the first guide slot 51 and at the same time the second pin 54 is slid to the third horizontal part 52c of the second guide slot 52, thereby causing the lift arm 47 to be pivotally turned clockwisely to its uppermost position. It is to be noted that such clockwise movement of the lift arm 47 is caused by a fact that the forward movement of the lid 9 is suppressed by the lock mechanism 23. Thus, the lid 9 assumes the tilt-up position as shown in FIG. 4.

When, by energizing the electric motor to run in a reversed direction, the second sliding shoe 49 is slid rearward (that is, rightward in FIG. 4) by a given small distance, the first and second pins 53 and 54 return to the second parts 51b and 52b of the first and second guide slots 51 and 52. Thus, the lift arm 47 returns to its rest position causing the lid 9 to assume the fully closed position as shown in FIG. 5.

When the second sliding shoe 49 is further slid rearward due to the operation of the electric motor, the first and second pins 53 and 54 of the lift arm 47 move to the first parts 51a and 52a of the first and second guide slots 51 and 52 causing the lift arm 47 to assume its lowermost position. Thus, the lid 9 assumes the tilt-down position as shown in FIG. 6 wherein the rear end of the lid 9 is placed below the outer panel 5. Under this condition, the operation lever 29 (more specifically, the upward projection 45 of the lever 29) of the first sliding shoe 19a is pressed downward by the lower surface 13b of the mounting bracket 13 cancelling the latched engagement of the first sliding shoe 19a to the guide rail 17. The rearward movement of the second sliding shoe 49 causes the dove-tail engaging portion 57 of the shoe 49 to collide against the strut member 75 of the third sliding shoe 55 thereby achieving a connection between the second and third sliding shoes 49 and 55.

When the second sliding shoe 49 is further slid rearward due to the continuous operation of the electric motor, the lid 9 is moved into a container space W defined below the outer panel 5 of the vehicle roof, together with the first, second and third sliding shoes 19a, 49 and 55. Thus, under this condition, the sun roof opening 7 is fully opened.

When, now, the electric motor is energized to run in a reversed direction, the second sliding shoe 49 is slid forward together with the lid 9. During this sliding, the third sliding shoe 55 comes to the given position where the clip 67 is engaged with the stopper recesses 71 of the guide rail 17. Thus, further forward movement of the lid 9 is carried out with the third sliding shoe 55 left at the given stopped position. That is, the first and second sliding shoes 19a and 49 come to the positions as shown in FIG. 6 and finally assume the positions as shown in FIG. 5 by effecting operations which are reversed to those carried out during the movement of the lid 9 from the position FIG. 5 to the position of FIG. 6. When the lid 9 assumes the fully closed position of FIG. 5, the stopper pin 27 of the lock mechanism 23 is projected into the stopper opening 39 of the first sliding shoe 19a to achieve the latched engagement of the first sliding shoe 19a relative to the guide rail 17.

What is claimed is:

1. In a sun roof structure including a lid and a sun roof opening defined by a roof,
a lid regulating device comprising:
a guide rail extending along each side of said sun roof opening and secured to said roof;
a first sliding shoe slidably engaged with said guide rail, said first sliding shoe having an extension which is pivotally connected to a front portion of said lid, said extension having a stopper opening formed therethrough;
a stopper structure including a holder securedly mounted on said guide rail, a stopper pin axially movably held by said holder, and biasing means for biasing said stopper pin outwardly, said stopper pin being projected into said stopper opening of the extension of said first sliding shoe when said lid is brought to its fully closed position;
an operation lever pivotally connected to said first sliding shoe, said operation lever having a projection which, when the lid assuming the fully closed position is tilted downward, pushes said stopper pin against the force of said biasing means thereby to disengage said stopper pin from said stopper opening; and
a second sliding shoe slidably engaged with said guide rail and supporting a rear portion of said lid, said second sliding shoe having a lift mechanism mounted thereon to tilt said lid upward and downward about said front portion of the lid.

2. A lid regulating device as claimed in claim 1, in which said operational lever is formed with another projection which contacts a lower surface of a mounting bracket when said lid is tilted downward from the fully closed position, said mounting bracket being secured to a lower surface of said lid.

3. A lid regulating device as claimed in claim 2, in which said holder of said stopper structure is formed with a bore in which said stopper pin is slidably received, and in which said biasing means is a coil spring disposed in a bottom of said bore to bias said stopper pin to project outwardly.

4. A lid regulating device as claimed in claim 3, in which said another projection of said operation lever is positioned nearer to the pivotally connected portion of the same than the projection which pushes said stopper pin.

5. A lid regulating device as claimed in claim 4, in which said holder is formed with a recess facing toward said second sliding shoe, and in which said first sliding shoe is formed with a boss, said boss intimately engaged with said recess when said lid comes to the fully closed position.

6. A lid regulating device as claimed in claim 5, in which said recess has a wedge-shaped bottom, and in which said boss has a wedge-shaped tip, so that upon fully closing of said lid, said boss and said recess are intimately engaged thereby suppressing an upward and downward play of the front portion of the lid relative to the roof.

7. A lid regulating device as claimed in claim 6, in which said operation lever partially occupies a recess formed in said extension of said first sliding shoe.

8. A lid regulating device as claimed in claim 2, in which said lift mechanism of said second sliding shoe comprises:
   mutually spaced first and second walls formed on said second sliding shoe, said first and second walls being respectively formed with first and second guide slots each extending along the corresponding wall; and
   a lift arm having one end pivotally connected to the rear portion of said lid, said lift arm having at its opposed side surfaces first and second pins which are respectively and slidably engaged with said first and second guide slots.

9. A lid regulating device as claimed in claim 8, in which said first and second guide slots and said first and second pins are so constructed and arranged that when, with said lid assuming the fully closed position, said second sliding shoe is moved toward said first sliding shoe, said lift arm is gradually raised, and when, with said lid assuming the fully closed position, said second sliding shoe is moved away from said first sliding shoe, said lift arm is gradually lowered.

10. A lid regulating device as claimed in claim 9, in which said first wall is constructed shorter than said second wall in order to facilitate coupling of said lift arm and said first and second walls.

* * * * *